United States Patent
Rincon

(10) Patent No.: US 8,907,006 B1
(45) Date of Patent: Dec. 9, 2014

(54) FILLER-CONTAINING LIQUID SILICONE RUBBER BASE OF IMPROVED COLOR AND REPRODUCIBILITY

(71) Applicant: Wacker Chemical Corporation, Adrian, MI (US)

(72) Inventor: Helio Rincon, Adrian, MI (US)

(73) Assignee: Wacker Chemical Corporation, Adrian, MI (US)

( * ) Notice: Subject to any disclaimer, the term of this patent is extended or adjusted under 35 U.S.C. 154(b) by 0 days.

(21) Appl. No.: 13/938,540

(22) Filed: Jul. 10, 2013

(51) Int. Cl.
*C08L 83/07* (2006.01)
*C08K 3/36* (2006.01)
*C08K 5/544* (2006.01)

(52) U.S. Cl.
CPC .. *C08K 5/544* (2013.01); *C08K 3/36* (2013.01)
USPC .......... 524/588; 427/215; 427/219; 428/403; 428/404; 428/405

(58) Field of Classification Search
None
See application file for complete search history.

(56) References Cited

U.S. PATENT DOCUMENTS

| | | | |
|---|---|---|---|
| 2,938,009 A | 5/1960 | Lucas | |
| 3,334,062 A | 8/1967 | Brown et al. | |
| 3,397,220 A | 8/1968 | Klebe | |
| 3,635,743 A | 1/1972 | Smith | |
| 5,506,303 A | 4/1996 | Yoshida et al. | |
| 6,130,272 A * | 10/2000 | Dopp et al. | 523/212 |
| 6,288,143 B1 | 9/2001 | Caradori et al. | |
| 2006/0247349 A1* | 11/2006 | Kollmann et al. | 524/268 |

* cited by examiner

*Primary Examiner* — Marc Zimmer
(74) *Attorney, Agent, or Firm* — Brooks Kushman P.C.

(57) ABSTRACT

Liquid silicone rubber base polymer compositions having improved color are prepared by reaction of fumed silica reinforcing filler with a silazane, and without drying the silazane-treated filler, an aliphatically unsaturated silicone is added, heated to above 80° C., and then further aliphatically unsaturated silicone is added. The compositions have improved whiteness and color reproducibility.

19 Claims, No Drawings

FILLER-CONTAINING LIQUID SILICONE RUBBER BASE OF IMPROVED COLOR AND REPRODUCIBILITY

BACKGROUND OF THE INVENTION

1. Field of the Invention

The present invention pertains to liquid silicone rubber base compositions comprising an organopolysiloxane with multiple aliphatically unsaturated functional groups and a pyrogenic silica filler, and in particular to a process for preparing liquid silicone rubber base compositions with improved whiteness, in a reproducible manner.

2. Description of the Related Art

Liquid silicone rubber ("LSR") is now widely used commercially, for example for the molding of films and articles, coatings, caulks, sealants, and the like. LSR contains at least one organopolysiloxane bearing multiple aliphatically unsaturated groups such as vinyl groups, allyl groups, higher 1-alkenyl groups (meth)acryloyl groups, ethynyl groups, and the like. To achieve high strength after crosslinking to a solid, relatively large amounts of reinforcing fillers are added. The compositions may also contain conventional components such as low molecular weight crosslinkers, adhesion promoters, dyes, pigments, etc.

The base polymer composition may be crosslinked by addition of a free radical initiating catalyst; photochemically crosslinked by addition of a suitable photocuring catalyst (curing then taking place upon exposure to actinic radiation, e.g. UV light); or may be mixed with an Si—H functional crosslinker and hydrosilylation catalyst. These systems may be prepared as one component or two component systems. An inhibitor is often added to systems which cure by hydrosilylation to promote storage stability or to increase pot life. The LSR base polymer composition is common to all these systems, and great demand is placed on its quality, including color, viscosity, viscosity change during storage, homogeneity, and the like. In addition, the base polymer composition must be tailored to provide suitable physical characteristics of the cured polymer, including hardness, resiliency, compression set, tensile strength, modulus, elongation, tear strength, tear propagation strength, etc.

A principle problem which affects numerous characteristics of both the base rubber polymer and the cured product, is incorporation of the reinforcing filler, which is often present in large amounts. Pyrogenic silica (fumed silica) is often used as a reinforcing filler, which requires a specific surface area (BET) of greater than 50 $m^2/g$. While colloidal silica also meets this surface area criterion, colloidal silica, due to its wet preparation method, is much more hydrophilic than fumed silica, and hence the latter is the reinforcing filler of choice.

However, fumed silica is also relatively hydrophilic, due to its content of surface silanol groups. Homogeneously dispersing such fillers into a very hydrophobic silicone is exceptionally difficult, and requires numerous mixing stages, each operating for significant periods of time. Even so, the resultant mixture is still often inhomogeneous, sometimes even with macroscopic domains of poorly incorporated filler.

To avoid such problems, hydrophobing the filler has long been practiced. Two methods of hydrophobing are known. In the first method, "ex situ" hydrophobing, fumed silica is reacted with a hydrophobing agent such as an alkoxyalkylsilane, chloroalkylsilane, alkyldisilazane, akoxy- or hydroxyl-functional oligo- or polysiloxane or a cyclopolysiloxane. The silica thus "loaded" or even partially reacted, is then "reacted" at elevated temperature, following which the hydrophobic silica is stripped of unreacted hydrophobing agents, and dried. Ex situ silica hydrophobizing is disclosed, for example, in U.S. Pat. Nos. 2,938,009; 3,334,062; 3,397,220; and 3,635,743.

In the U.S. Pat. No. 3,635,743 patent, the fumed silica is first treated with ammonia or an organic amine, followed by reaction with the hydrophobing reagent. A preferred hydrophobing reagent is hexamethyldisilazane. The silica must contain adsorbed or absorbed water, and sufficient additional water is added to ensure complete hydrolysis and reaction of the hexamethyldisilazane. The silica is agitated several hours at 130° C. and dried in an oven for 24 hours at 150° C. The dry pulverulent product contains substantially no silanol groups, these having been etherified with trimethylsilyl groups.

Such pulverulent hydrophobic silicas are much easier to disperse in hydrophobic media of all types, including aliphatically unsaturated silicones. However, the preparation method involves a long processing time at elevated temperature (including drying and stripping of unreacted hydrophobing agents), and transportation of the product is not particularly economical due to its low density, unless the product is compacted prior to shipment. This, however, then requires the product to be "decompacted" at the point of use, a separate step, and includes the risk that some portions may remain in compacted or partially compacted form, thus forming inhomogeneous domains in the product.

Thus, "in situ" methods of hydrophobing silica have been developed. In the in situ method, hydrophilic fumed silica is added to the hydrophobic continuous phase, e.g. an aliphatically unsaturated silicone, and a hydrophobing agent is added. The slurry of silica and hydrophobing reagent in the hydrophobic continuous phase is intensively mixed, and heated to a temperature sufficient for hydrophobing to be effected, for example 150-160° C., and then cooled. At this point, additional composition ingredients such as additional aliphatically unsaturated silicone are added, and the mixture is homogenized in at least one, but often in a plurality of mixers or kneaders.

A problem which exists with such in situ methods is "structuring", which is believed to be caused by interaction of the filler and the continuous phase, resulting in an undesired high viscosity, or even thixotropy. Furthermore, it has been found that in situ methods frequently produce base polymer compositions where the color is off, i.e. a significant and visually observable coloration, generally yellow (Y* component of the color index) is present. Furthermore, areas of microinhomogeneity are often present, which affects transparency as well as product properties such as tear strength, elongation, and tear propagation strength (crack arrestment).

In U.S. Pat. No. 5,506,303, for example, the problems of high viscosity and crack propagation are particularly noted with respect to in situ hydrophobing. The U.S. Pat. No. 5,506,303 patent proposes to overcome these deficiencies by adding, in a first step, an untreated (hydrophilic) fumed silica to a first portion of silicone base polymer while maintaining the temperature below 80° C., optionally with a hydrophobing agent such as a silazane, then, in a second step, mixing a further portion of silicone base polymer with the product of the first step, and only then thermally treating the mixture obtained in the second step, to provide a silicone base polymer composition of low viscosity and good crack propagation resistance.

However, U.S. Pat. No. 5,506,303 cautions that the base polymer must be added in two distinct portions, and also cautions that it is exceedingly important that the initial (first step) and second step mixtures must be held to less than 80° C. during the mixing procedure and at all times prior to thermal treatment. For example, a composition where all the silicone oil was added in one step had a viscosity of ca. 200,000 poise, as compared to ca. 7000 poise when two step addition was used. If the temperature during the first mixing step was raised to the reaction temperature of the hydrophobing reagent prior to addition of additional base polymer, the hardness, elongation, tear strength, and crack arrestment properties all declined substantially. However, even when the procedure disclosed by U.S. Pat. No. 5,506,303 is used, the product color is often observably discolored, which is undesirable.

U.S. Pat. No. 6,288,143 is not directed to the same field of endeavor as applicants, but acknowledges that in filler-containing condensation curable compositions, long mixing times of 3 to 5 days are required. The U.S. Pat. No. 6,288,143 patent addresses this problem by an in situ master batch process, where a highly filler-loaded master batch of silica in a non-reactive silicone oil, i.e. a trimethylsilyl-capped polydimethylsiloxane, is prepared, and this master batch is then diluted with a reactive, condensation curable (moisture curable) silicone to produce an RTV-1 composition. However, the use of a non-reactive silicone in the master batch decreases the obtainable tensile strength and modulus, and in some cases, the non-reactive silicone can exude or "sweat" from the cured product. This method is thus generally unacceptable for addition-curable systems.

It would be desirable to provide a process for the preparation of filler-containing silicone base polymer compositions useful as a component in addition-curable LSR systems which avoids the problems of the prior art. It would be most desirable to provide for a one pot preparation where lengthy cycle times are avoided, where the base polymer composition is of low viscosity, the silicone rubber base composition is substantially free of discoloration, e.g. is white in color, and which provides cured products with excellent physical properties.

SUMMARY OF THE INVENTION

It has now been surprisingly and unexpectedly discovered that liquid silicone rubber base polymer compositions of very low color can be prepared expeditiously by first reacting a silazane with fumed silica in the presence of sufficient water, and without isolating the hydrophobic silica, then adding a first portion of silicone base polymer, heating to an elevated temperature above 80° C. to further react the silazane with silica, and then adding a further portion of silicone base polymer. Surprisingly, this process not only results in products with lower color, but also results in products whose color is less subject to variation, batch to batch.

DETAILED DESCRIPTION OF THE PREFERRED EMBODIMENT(S)

By the term "liquid silicone base polymer" or "silicone base polymer" is meant a liquid silicone polymer (organopolysiloxane) containing a multiplicity of aliphatically unsaturated groups. By the term "fumed silica" is meant a pyrogenic silica produced by flame hydrolysis of a hydrolysable silane precursor. Fumed silica and its production methods are well known in the art, and is a widely available article of commerce, for example as HDK® fumed silica available from Wacker Chemical Corporation, Adrian, Mich., and Wacker Chemie AG, Munich, Germany, and will not be further described.

The process of the invention may be briefly described as an at least three step process. In the first step, a silazane is reacted with fumed silica in the presence of water, without the substantial presence of any silicone base polymer. In a second step, silicone base polymer is added, and heated to a temperature above 80° C. sufficient for reaction of disilazane with silica. In a third step, additional base polymer is added.

The silazane used in the first step may be any silazane useful for the hydrophobing of silica, preferably a disilazane. The most preferred disilazanes are hexamethyldisilazane ("HMN") and divinyltetramethyldisilazane ("VMN"). Both of these are commercially available products. Less preferred disilazanes, generally due to cost considerations, are disilazanes substituted with other substituents, preferably $C_{2-18}$ alkyl groups, most preferably $C_{2-6}$ alkyl groups, i.e. ethyl groups; aryl groups such as phenyl and napthyl, arylalkyl groups such as benzyl and phenylethyl; alkaryl groups such as tolyl and xylyl; cycloalkyl groups, and the like. These groups may optionally be substituted, for example, by chloro, fluoro, cyano, alkoxy, and similar substituents.

The disilazane may also include Si-bonded unsaturated groups such as vinyl, alkyl, propenyl, isopropenyl, 5-hexenyl (meth)acryloxy, and the like. Since effective hydrophobing does not require unusual or exotic substituents, substituents selected from $C_{2-6}$ alkenyl and $C_{1-6}$ alkyl are preferred, with methyl, ethyl, vinyl and allyl groups being more preferred, and with methyl and vinyl being most preferred. In addition to disilazanes, polysilazanes such as hexamethylcyclotrisilazane and octamethylcyclotetrasilazane are also useful, as well as other cyclic silazanes which act by a ring opening reaction with silanol groups. The disilazanes and polysilazanes described above include all organic disilazanes useful for hydrophobing fumed silica, and are referred to hereafter as "organic disilazanes," or more simply, "silazanes".

The silazanes are used in an amount effective to achieve the desired hydrophobicity. This latter can be determined easily by one skilled in the art, and can be adjudged by the ease with which the hydrophobic silica can be incorporated into the silicone base polymer, and the homogeneity of the resultant base polymer composition. In general, the effective amount of silazane will be proportional to the surface silanol content, e.g. in nmol/g or µmol/g, with more hydrophilic fumed silicas requiring more silazane and less hydrophilic silicas requiring less silazane. On a weight percent basis, the silazane is generally present in an amount, based on silica, of 1 to 40% by weight, preferably 5 to 40% by weight, more preferably 10 to 40% by weight, and most preferably 20% to about 30% by weight. The amount is preferably such that the hydrophobicized silica contains from 2 to 20 weight percent, preferably 5 to 10 weight percent of dimethylsiloxy units or 3 to 20 weight percent, preferably 6 to 12 weight percent of trimethylsiloxy units, and when a mixture of dimethylsiloxy and trimethylsiloxy groups, or other silazane-derived groups are present, these amounts are adjusted accordingly. The weight percentages are based on the total weight of the hydrophobic silica.

The fumed silica useful in the invention include fumed silicas having a specific surface area, measured by the BET method, of at least 50 $m^2/g$, and more preferably 200 $m^2/g$ to 300 $m^2/g$. As indicated previously, such fumed silicas are commercially available. Also useful, but less preferred, are partially hydrophobicized silicas which have been hydrophobicized only partially and then dried. Such silicas still contain a significant amount of unreacted silanol groups, e.g. more than 10% (mol %) of the original surface silanol group content as determined by the Sears method or by $^{29}Si$ NMR, more preferably more than 20%, yet more preferably more than 30%, and most preferably, in increasing order of preference, more than 40%, 50%, 60%, 70%, 80%, and 90%. Most preferably, partially hydrophobicized fumed silicas are not employed, as this then involves a separate process, which at least partially defeats the cost advantages of the present invention. The fumed silica is preferably present, calculated on the basis of non-hydrophobicized fumed silica relative to the total weight of unsaturated organopolysiloxanes base polymers, at from 10 to 60 weight percent, more preferably 20 to 50 weight percent, and most preferably from 30 to 50 weight percent. Amounts of from 35 to 45 weight percent are especially preferable.

The silica may optionally be treated with ammonia or an organic amine, preferably ammonia, prior to contact with the organic disilazane, but this is not preferred.

Water or another protic substance, preferably water, must be present during the first step of the process. Water may be present in adsorbed or absorbed form on the fumed, silica, or may be added separately. Deionized water or reverse osmosis-produced water is preferably used. Water should preferably be present in sufficient amount to react with substantially all of the silazane added. This amount is thus at least partially dependent upon the amount of silazane added, which is also dependent upon the surface silanol content of the silica. Suitable amounts of water can easily be determined by one skilled in the art, for example by monitoring unreacted silazane, by monitoring the amount of ammonia liberated, or by measuring the hydrophobicity of the silica. For example, as a laboratory analytical technique, the hydrophobicized or partly hydrophobicized silica from the first step may be heated to fully react the silazane, and its methanol number measured. A methanol number greater than 30, more preferably greater than 50, is most desired. Based on the weight of silica, water is usually present in amounts of from 0.1 to 15 weight percent, more preferably 0.2 to 12 weight percent, and most preferably 0.5 to 12 weight percent.

The first step reaction between the silazane and silica, in the presence of a protic substance, preferably water, is generally effected at a temperature of from −20° C. to 100° C., preferably 0° C. to 80° C., more preferably 10° C. to 60° C., and most preferably at a temperature established by mixing silica, silazane and water in a stirred reactor at room temperature, without the use of external heat or cooling, which is preferred. Upon mixing, an exotherm will be produced as the silazane reacts. This exotherm may cause the temperature to rise, for example, to a temperature of from 40° C. to 70° C., preferably 50-60° C. The final temperature reached is not critical so long as coloration is avoided, but should be sufficient to react a substantial portion of the silazane at this stage. Ammonia will be generated at this stage, and is preferably removed according to best practice, for example by absorption in a scrubber. A flow of inert gas, preferably nitrogen, may assist in removal of ammonia. The amount of ammonia removed may be used to assess the progress of the reaction, but this is generally not necessary. This first stage preferably takes place over from 30 minutes to 4 hours, although shorter or longer times are possible as well. The reaction period of the first step is preferably as short as possible consistent with the degree of reaction, for reasons of economics. A reaction time of from 1 to 3 hours, more preferably 1 to 2 hours, is preferable. After the first step, the hydrophobed silica or partly hydrophobed silica is not isolated and dried. The first step preferably takes place in the same vessel or reactor which will be used in subsequent steps, a so-called "one pot preparation."

In the second step of the process, the silicone base polymer is added, preferably but not necessarily, without cooling the first step product. The temperature then drops by dilution, to, for example 40° C. or lower, or even to room temperature.

The silicone base polymer used in the second step is at least one silicone base polymer containing, on average, preferably at least two aliphatically unsaturated groups, these silicones being organopolysiloxanes containing at least three silicon atoms. Where low modulus products are desired, the average content of aliphatically unsaturated groups may be less than two. This may be achieved, for example, by incorporating silicone polymers bearing a single unsaturated group in conjunction with silicone polymers containing two or more unsaturated groups. It is preferable that a low average functionality not be achieved by dilution with a non-functional silicone oil, as tensile strength will decrease and exudation of silicone oil may later occur. In many applications, these properties are undesirable. Thus, it is preferable that all of the silicones used contain at least one aliphatically unsaturated group.

The preferred silicone base polymers are thus aliphatically unsaturated organopolysiloxanes comprising units of the formulae $$R^1_a R_b SiO_{1/2} \tag{M}$$

where a and b are 0 to 3 and the sum of (a+b) is 3;

$$R^1_c R_d SiO_{2/2} \tag{D}$$

where c and d are each 0 to 2 and the sum of (c+d) is 2;

$$R^1_e R_f SiO_{3/2} \tag{T}$$

where e and f are each 0 or 1 and the sum of (e+f) is 1; and $$SiO_{4/2} \tag{Q}$$

with the proviso that at least one aliphatically unsaturated group $R^1$ is present, and preferably at least two $R^1$ groups are present on average per molecule.

$R^1$ is an aliphatically unsaturated group such as an alkynyl group, which is not preferred, and is preferably an aliphatically unsaturated group containing a carbon-carbon double bond. Suitable $R^1$ groups are vinyl, allyl, and (meth)acryloxy groups. Additional suitable groups include other alkylacryloxy groups, longer chain alkenyl groups, preferably (ω-1) terminal alkenyl groups such as the 3-butenyl and 5-hexenyl groups. Other groups such as urethane- or urea-linked aliphatically unsaturated groups are also, in principle, feasible. The vinyl group is most preferred for $R^1$.

R is an optionally substituted hydrocarbon group, which may be linear, branched, cyclic, aromatic, etc. Examples include alkyl groups such as $C_{1-18}$ alkyl groups, more preferably $C_{1-4}$ alkyl groups, and most preferably the methyl group; $C_{5-8}$ cycloaliphatic groups, preferably the cyclohexyl group, and alkyl substituted $C_{5-8}$ cycloalkyl groups such as the methylcyclohexyl and cyclohexylmethyl groups; aryl groups such as the phenyl and naphthyl groups and halo or alkyl substituted aryl groups such as the tolyl and xylyl groups and the o-, m- and p-chlorophenyl groups; and alkaryl groups such as the benzyl and the α, and β-phenylethyl groups. Most preferred for R are methyl, ethyl, propyl, and phenyl groups, most preferably the methyl group. In addition, in some cases, R may be a hydroxyl group or alkoxy group, preferably a $C_{1-4}$ alkoxy group, more preferably a methoxy or ethoxy group. In addition, other non-interfering groups such as cyano groups may be present, as well as chloro groups, generally as an undesired artifact from organopolysiloxane synthesis.

Thus, preferred liquid silicone base polymers are those corresponding to the general formula $$M_m D_n T_o Q_p$$

where M, D, T, and Q are siloxy groups as previously defined, and are, respectively, monofunctional, difunctional, trifunctional, and tetrafunctional, where m is at least 1 and is preferably 2 to 20, more preferably 2 to 10, yet more preferably 2 to 5, and most preferably 2 or 3, especially 2; n is from 1 to 100,000, preferably 1 to 10,000, more preferably 2 to 5000; o is from 0 to 1000, preferably 0 to 200, and more preferably 0 to 10; and p is from 0 to 20, preferably 0 to 10, and most preferably 0 to 5.

In general, T groups of the formula $R^2SiO_{3/2}$ and Q units comprise a most minor amount of the silicone base polymer, as these tend to increase the viscosity. T units are preferably used to add greater aliphatic unsaturation than can be achieved through only terminal (M) units bearing $R^1$ groups, by incorporating $R^1SiO_{3/2}$ T groups. T units, when present, are preferably present in amounts of less than 10 mol percent, more preferably less than 5 mol percent, and most preferably less than 3 mol percent. Q units are preferably absent, or present only in amounts which are unavoidable due to the method of preparation of the base polymer.

Preferred silicone base polymers are thus those corresponding to the formula $M_2D_nT_o$ where o is preferably 0 to 5, where the formula $M_2D_n$ is particularly preferred, in other words, the silicone base polymers are preferably α,ω-aliphatically unsaturated polyorganosiloxanes, most preferably α,ω-divinylpolydimethylsiloxanes. In all formulae, D, T, and Q groups (when present) can be in any order, and thus the silicone base polymers may be random, block, block random, etc. polymers.

Following addition of the initial silicone base polymer or polymers in the second step, the mixture continues to be agitated and is heated to a temperature higher than 80° C., preferably 100° C. to 200° C., more preferably from 130° C. to 180° C., and most preferably from 150° C. to 180° C. The initial heat required for raising the temperature is advantageously provided by the friction of mixing, which may be accomplished by numerous mixing devices known in the art, such as kneaders, single and twin screw mixers, vane stirrers, sigma blade mixers, and preferably rotor/stator mixers. Such intensive mixing may raise the temperature to 60° C. or higher, preferably 80° C. or higher, without the use of external heating. However, heating may also be provided primarily or solely by conventional heating devices. Following achieving a temperature preferably in the range of 60-100° C. by the mixing process, external heat is supplied. Heating at elevated temperature is maintained for from 1 to 10 hours, preferably 2 to 8 hours, and most preferably 4 to 6 hours, with continued agitation. During this process, any remaining water is removed, as well as residual ammonia from the first step and any additional ammonia produced by further reaction of silazane in the second step. Adding a stripping gas such as nitrogen may be beneficial. Vacuum removal, with or without stripping gas is also possible.

The second step is terminated by addition of additional silicone base polymer in a third step, preferably following cessation of external heating. The temperature rapidly drops, and the mixture is agitated to produce a homogenous mixture and preferably degassed. Further ingredients may be added at this time, as desired. These further ingredients may have already been mixed with the additional base polymer prior to its addition in the third step, if desired.

Examples of further ingredients are plasticizers, which are well known, and include, for example, mineral oils, dialkylphthalates, silicone oils, and the like; biocides; pigments; dyes; rheology adjusting agents; reactive or unreactive diluents, examples of reactive diluents being 1-hexene, 1-decene, and 1-dodecene; and fragrances. Solvents may also be added, but this is not desirable. Preferably, the LSR base compositions are free of volatile solvents.

Additional examples of further additives are adhesion promoters and non-reinforcing fillers. Non-reinforcing fillers are fillers having a BET surface area of less than 50 m²/g, for example ground mineral products such as limestone, dolomite, heavy spar, mica, both expanded and non-expanded, quartz, silicate minerals, chalk, smectites, wollastonite, and the like. Synthetic polymer fillers may also be used, including polymers in pulverulent form, in the form of hollow beads, etc. The fillers may be in fibrous form, particle form, or in the form of microballoons. Non-reinforcing fillers are preferably not present.

Suitable adhesion promoters are all those useful in addition crosslinkable silicone compositions, and are well known in the art. Silane adhesion promoters and their partial hydrolysates are preferred. Such silane adhesion promoters generally contain a polar functional group or a reactive functional group. Such groups include, for example, aminoalkyl groups, alkoxy groups, epoxy groups, isocyanate groups, carbamate groups, ureido groups, etc. Preferred adhesion promoters include vinyltrimethoxysilane, methyltrimethoxysilane, vinyltriethoxysilane, vinyltriacetoxysilane, methyl-carbamatotrimethoxysilane, aminomethyltrimethoxysilane, aminopropyltrimethoxysilane, N-aminoethyl-3-aminopropyltrimethoxysilane, glycidoxytrimethoxy-silane, and the partial hydrolysates thereof. When used, the adhesion promoters are generally present in amounts of from 0.1 to 10%, preferably 0.5 to 5% by weight, based on the weight of the silicone base polymer.

The liquid silicone rubber base polymer compositions are advantageous, in that they are simple to prepare, with minimal process steps, can desirably be prepared in but one reactor, and have improved freedom from coloration ("whiteness") as compared to liquid silicone rubber base polymer composition prepared conventionally, for example when a substantial portion of the silicone base polymer is present during hydrophobing of the silica. In this respect, it is preferred that the silicone base polymer be completely absent from the first step. However, it would still be without the scope of the invention for the silicone base polymer to be substantially absent, for example to include a most minor amount, i.e., less than 10% by weight of total silicone base polymer, preferably less than 5% by weight, yet more preferably less than 2% by weight, provided that the freedom from coloration of the final liquid polymer base composition can be achieved.

The liquid silicone rubber base compositions can be compounded with catalysts and crosslinkers to provide a curable liquid rubber composition.

In liquid silicone rubber compositions which are addition curable, a free radical initiator is added and blended with the liquid rubber base composition. This may occur at the time of preparation of the liquid rubber base composition, e.g. in the third preparation step as disclosed above (or immediately thereafter), preferably after cooling to a temperature below which the free radical initiator becomes active, preferably below 60° C., more preferably below 50° C., yet more preferably at or below 40° C., and most preferably at or below 30° C., for example at room temperature. The free radical initiator (catalyst) may also be added at a later point, for example after the liquid rubber base composition has been prepared, packaged, and/or shipped, or just prior to use. In photoinitiated systems, the same considerations apply, except that exposure to light of wavelengths which activate the photocatalyst should be avoided. In the case of either type of composition, the compositions can be packaged and remain storage stable for extended periods, with appropriate catalyst selection and storage conditions.

The liquid silicone rubber base compositions may be cured by addition using a thermally activatable or photo-activatable curing catalyst, or both. In such applications, additional ingredients other than the catalyst may be added as well. Examples include the adhesion promoters previously listed, and in particular, other organopolysiloxanes containing aliphatic unsaturation. Examples include both low viscosity and high viscosity linear and branched organopolysiloxanes, reactive diluents such as aliphatically unsaturated hydrocarbons, crosslinkers containing, on average, three or more aliphatically unsaturated groups, etc. These components are well known to those skilled in the art.

As free radical initiators (free radical catalysts), all catalysts useful for addition crosslinking can be used. These catalysts are well known in the art, and include, for example, organic peroxides such as cumene peroxide and dibenzoyl peroxide, and peroxyketones, peroxycarbonates, azo compounds, and the like. Reference may be had to Walter Noll, CHEMISTRY AND TECHNOLOGY OF SILICONES, Academic Press© 1968, pp. 230-231, 392-395 which is herein incorporated by reference.

Photo-initiators are also well known. Examples include the DAROCUR® photoinitiators available from BASF AG. Reference may also be had to K. Matyjaszewski, HANDBOOK OF RADICAL POLYMERIZATION, John Wiley & Sons, Hoboken, N.J.© 2002.

The liquid rubber base composition can also be hydrosilylatively cured. In this case, the compositions are preferably two or multi-part compositions, no one part containing all of the components: liquid silicone rubber base composition, Si—H functional crosslinker, and hydrosilylation catalyst. However, one component compositions are also feasible, so long as the catalyst is not sufficiently active at storage temperatures, or contains an appropriate amount of catalyst inhibitor.

Suitable Si—H functional crosslinkers are known and are commercially available. Preferred crosslinkers are organopolysiloxanes bearing terminal and/or pendant Si—H functionality. Preferred organopolysiloxanes, which have Si-bound hydrogen atoms, are organopolysiloxanes comprising units of the formula $$R^2{}_g H_h SiO_{(4-c-d)/2} \tag{II}$$

where
$R^2$ in each occurrence can be the same or different and has one of the meanings indicated above for R,
g is 0, 1, 2 or 3, and
h is 0, 1 or 2,
with the proviso that the sum total of g+h is not more than 3 and there are at least two and preferably at least three Si-bound hydrogen atoms per molecule. Preferably, the organosilicon compound contains Si-bound hydrogen in the range from 0.04 to 1.7 weight percent, based on the total weight of the organosilicon compound.

The molecular weight of the Si—H functional constituent can likewise vary within wide limits, for example up to $10^6$ g/mol. For instance, this constituent may comprise, for example, a relatively low molecular weight SiH-functional oligosiloxane such as tetramethyldisiloxane, or else a linear polysiloxane high polymer having chain-disposed or end-disposed SiH groups, or an SiH-containing silicone resin. Nor is the structure of the molecules forming the constituent fixed; more particularly, the structure of a comparatively high molecular weight, i.e., oligomeric or polymeric, SiH-containing siloxane can be linear, cyclic or branched. Linear and cyclic polysiloxanes are preferably composed of units of the formula  $R^2{}_3SiO_{1/2}$, $HR^2{}_2SiO_{1/2}$, $HR^2SiO_{2/2}$ and $R^2{}_2SiO_{2/2}$, where $R^2$ is as defined above.

Particular preference for use as a hydrosilylative crosslinker is given to low molecular weight SiH-functional compounds, such as tetrakis(dimethylsiloxy)silane and tetramethylcyclotetrasiloxane, and also comparatively high molecular weight, SiH-containing siloxanes, such as poly (hydromethyl)siloxane and poly(dimethyl/hydromethyl)siloxanes having a viscosity at 25° C. of 10 to 10,000 mm²/s, or analogous SiH-containing compounds wherein some of the methyl groups are replaced by 3,3,3-trifluoropropyl or phenyl groups.

The Si—H functional crosslinker is preferably present in the present invention's hydrosilylatively crosslinkable composition in such an amount that the molar ratio of SiH groups to aliphatically unsaturated groups is in the range from 0.1 to 20 and more preferably between 1.0 and 5.0.

Preferably, a hydrosilylation catalyst from group 8, 9 or 10 of the Periodic Table is present. This means that metals, and their compounds, such as platinum, rhodium, palladium, ruthenium and iridium, preferably platinum, can be used. The metals may if appropriate be fixed on finely divided support materials, such as activated carbon, metal oxides, alumina or silica.

Preferred hydrosilylation catalysts are platinum and platinum compounds, more preferably such platinum compounds as are soluble in polyorganosiloxanes. Soluble platinum compounds include for example the platinum-olefin complexes of the formulae $(PtCl_2.olefin)_2$ and $H(PtCl_3.olefin)$, which preferably utilize alkenes of 2 to 8 carbon atoms, such as ethylene, propylene, isomers of butene and of octene, or cycloalkenes of 5 to 7 carbon atoms, such as cyclopentene, cyclohexene and cycloheptene. Useful soluble platinum catalysts further include the platinum-cyclopropane complex of the formula $(PtCl_2C_3H_6)_2$, the reaction products of hexachloroplatinic acid with alcohols, ethers and aldehydes or mixtures thereof, or the reaction product of hexachloroplatinic acid with methylvinylcyclotetrasiloxane in the presence of sodium carbonate in ethanolic solution. It is similarly possible to use platinum catalysts with phosphorus, sulfur and amine ligands, an example being $(Ph_3P)_2PtCl_2$. Particular preference for use as a hydrosilylation catalyst is given to complexes of platinum with vinylsiloxanes, such as sym-divinyltetramethyldisiloxane.

The amount of the hydrosilylation catalyst depends on the desired rate of crosslinking and on the particular use and also economic aspects. The compositions of the present invention preferably include platinum catalysts in such amounts as to give a platinum content of 0.01 to 1000 weight ppm (=parts by weight per million parts by weight), more preferably 0.05 to 500 weight ppm and particularly 0.1 to 100 weight ppm, all based on the total weight of the composition.

Optionally, inhibitors are incorporated to adjust the pot life, light-off temperature and crosslinking rate of the compositions, examples being acetylenic alcohols such as 1-ethynyl-1-cyclohexanol, 2-methyl-3-butyn-2-ol, 3,5-dimethyl-1-hexyn-3-ol, 3-methyl-1-dodecyn-3-ol, trialkyl cyanurates, alkyl maleates such as diallyl maleates, dimethyl maleate and diethyl maleate, alkyl fumarates such as diallyl fumarate and diethyl fumarate, organic hydroperoxides such as cumene hydroperoxide, tert-butyl hydroperoxide and pinane hydroperoxide, organic peroxides, organic sulfoxides, organic amines, diamines and amides, phosphines and phosphites, nitriles, triazoles, diaziridines and oximes. Other inhibitors are known in the art.

The inhibitors which are optionally used preferably comprise ethynylcyclohexanol, 2-methyl-3-butyn-2-ol and alkyl maleates, of which ethynylcyclohexanol and 2-methyl-3-butyn-2-ol are particularly preferred.

The hydrosilylatively crosslinkable compositions of the present invention preferably include inhibitors in amounts of 0.01 to 3 parts by weight, more preferably 0.02 to 1 part by weight and particularly 0.03 to 0.5 parts by weight, all based on 100 parts by weight of the composition.

The photocuring catalysts used in hydrosilylatively curable compositions may be any catalyst from the platinum group which catalyze the hydrosilylation reactions which proceed in the course of crosslinking of addition-crosslinking silicone materials and are activatable by light from 200 to 500 nm, and generally contain at least one metal or one compound of platinum, rhodium, palladium, ruthenium and iridium, preferably platinum. Particularly suitable photocuring catalysts are cyclopentadienyl complexes of platinum. A particularly preferred catalyst is MeCp (PtMe$_3$). The catalyst can be used in any desired form, for example including the form of microcapsules containing hydrosilylation catalyst, or organopolysiloxane particles, as described in EP-A1006147. The content of hydrosilylation catalysts is preferably selected such that the silicone mixture has a content of platinum group metal of 0.1-200 ppm, preferably 0.5-40 ppm.

All these compositions, whether addition crosslinkable or curable by hydrosilylation may contain additional components as previously described.

Having generally described this invention, a further understanding can be obtained by reference to certain specific examples which are provided herein for purposes of illustration only and are not intended to be limiting unless otherwise specified.

EXAMPLE 1

To a stirred 1700 liter reactor is added 540 kg of HDK® T30P fumed silica having a BET surface area of 300 m$^2$/g, 161 kg of hexamethyldisilazane, and 59 kg of water purified by reverse osmosis. The temperature is kept low by external cooling while the fumed silica is added in the range of about 45° C. to 35° C. An exotherm is noted which raises the temperature to about 55° C., and evolution of ammonia is observed. 600 kg of a 20,000 mPas α,ω-vinyl-terminated, polydimethymethylsiloxane (two terminal vinyl groups) is then added over a period of about 3.5 hours and the temperature drops to about 40° C. The mixture is vigorously agitated, and the heat of friction from incorporating the filler into the vinyl polymer causes the temperature to rise to about 95° C., at which time external heat is applied to raise the temperature to about 165° C., at which temperature the composition is maintained for about five hours, during which ammonia and water are removed, assisted by a nitrogen sparge, and at slightly reduced pressure generated by a downstream ammonia scrubber. The supply of external heat is then terminated, and 727 kg of additional vinyl polymer is added, the temperature decreasing to about 85° C. over about 2.5 hours. The composition is then removed from the reactor and packaged. The product is observed to be highly homogenous, with a very bright white color.

Comparative Example C1

To a stirred 1700 liter reactor is initially charged 200 kg of a 20,000 mPas·s α,ω-vinyl-terminated polydimethylsiloxane (two terminal vinyl groups), 59 Kg of reverse osmosis water, 166 kg of hexamethyldisilazane, and 540 kg of HDK® T30P fumed silica. Then, an additional 412 kg of the 20,000 mPa·s α,ω-vinyl-terminated polydimethylsiloxane is added while maintaining a temperature below 85° C. Following thorough mixing, the temperature is increased to 165° C. and maintained for 5 hours while ammonia and water are removed, assisted by a nitrogen sparge and slightly reduced pressure. The viscous mixture is then diluted with 707 kg of the 20,000 mPa·s α,ω-vinyl-terminated dimethylpolyorganosiloxane and removed from the reactor.

The color values of a statistically-significant number of batches prepared by the inventive process (Example 1) and by the comparative process are measured and compared. The inventive process resulted in a mean L* color value of 80.62, while the batches prepared in accordance with the comparative process had a mean value of 78.97. Thus, the inventive liquid silicone rubber base compositions were significantly less yellow, i.e. more white in appearance. Visual whiteness appears even more pronounced than the difference in measured L* values would indicate.

In addition, the color of the liquid silicone rubber base compositions prepared by the inventive process were much more reproducible. The standard deviation of L* was 2.4 for the inventive process, but 4.2 for the comparative process. The lowest L* values for the inventive process was about 72, while the lowest L* value for the comparative process was about 65. These values do not include a number of batches prepared by the comparative process which were scrapped due to being even more discolored.

The respective liquid silicone rubber base compositions (inventive and comparative) were compounded with standard addition-curable additives and cured to produce a 70 durometer elastomer. Tensile strength measurements showed no significant difference in tensile strength or tear strength.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of liquid silicone rubber base polymer compositions, comprising
   a) admixing fumed silica with a silazane and a protic substance in the substantial absence of an organopolysiloxane bearing aliphatically unsaturated groups, and removing ammonia to form an at least partially reacted product;
   b) immediately following step a), mixing at least one organopolysiloxane (i) bearing at least one aliphatically unsaturated group with said at least partially reacted product from step (a), heating the mixture thus obtained to a temperature above 80° C. and removing further ammonia and removing water to form a hydrophobic filler-containing intermediate product; and
   c) adding further organopolysiloxane (ii) bearing at least one aliphatically unsaturated group to said hydrophobic filler-containing intermediate product, and cooling to form a liquid silicone rubber base polymer composition, wherein at least a portion of organopolysiloxane (i) or organopolysiloxane (ii) bears at least two aliphatically unsaturated groups, wherein steps a), b), and c) all take place within one reactor.

2. The process of claim 1, wherein the silazane is a disilazane.

3. The process of claim 1, wherein the silazane comprises at least one of hexamethyldisilazane or divinyltetramethyldisilazane.

4. The process of claim 1, wherein fumed silica is present in step a) in an amount of from 10 to 60 weight percent based on the total amount of organopolysiloxanes bearing at least one aliphatically unsaturated group added in steps b) and c).

5. The process of claim 1, wherein fumed silica is present in step a) in an amount of from 30 to 50 weight percent based on the total amount of organopolysiloxanes bearing at least one aliphatically unsaturated group added in steps b) and c).

6. The process of claim 1, wherein the protic substance comprises water.

7. The process of claim 6, wherein water is present in an amount of from 0.1 to 15 weight percent based on the weight of fumed silica.

8. The process of claim 1, wherein silazane is present in an amount of 1 to 40 weight percent, based on the weight of fumed silica.

9. The process of claim 1, wherein silazane is present in an amount of 10 to 40 weight percent, based on the weight of fumed silica.

10. The process of claim 1, wherein silazane is present in an amount of 20 to 30 weight percent, based on the weight of fumed silica.

11. The process of claim 1, wherein no organopolysiloxane is present in step a).

12. The process of claim 1, wherein in step b), the mixture is heated to a temperature in the range of from 130° C. to 180° C.

13. A process for the preparation of liquid silicone rubber base polymer compositions, comprising
   a) admixing fumed silica with a silazane and a protic substance in the substantial absence of an organopolysiloxane bearing aliphatically unsaturated groups, and removing ammonia to form an at least partially reacted product;
   b) immediately following step a), mixing at least one organopolysiloxane (i) bearing at least one aliphatically unsaturated group with said at least partially reacted product from step (a), heating the mixture thus obtained to a temperature above 80° C. and removing further ammonia and removing water to form a hydrophobic filler-containing intermediate product; and
   c) adding further organopolysiloxane (ii) bearing at least one aliphatically unsaturated group to said hydrophobic filler-containing intermediate product, and cooling to form a liquid silicone rubber base polymer composition, wherein at least a portion of organopolysiloxane (i) or organopolysiloxane (ii) bears at least two aliphatically unsaturated groups, wherein in step b), the mixture is heated to a temperature in the range of from 150° C. to 180° C. and is maintained within this temperature range for 1 to 10 hours.

14. The process of claim 1, wherein in step b) intensive mixing is performed which raises the temperature of the mixture above 60° C. without external heat, and external heat is applied to raise the temperature to a temperature in the range of 130° C. to 180° C.

15. The process of claim 1, wherein prior to step c), heating is terminated.

16. The process of claim 1, wherein heating is continued during addition of at least a portion of the organopolysiloxanes (ii) bearing at least one aliphatically unsaturated group in step c).

17. The process of claim 1, wherein the organopolysiloxanes (i) and (ii) bearing at least one aliphatically unsaturated group comprise those comprising units of the formulae $$R^1_a R_b SiO_{1/2} \tag{M}$$

where a and b are 0 to 3 and the sum of (a+b) is 3;

$$R^1_c R_d SiO_{2/2} \tag{D}$$

where c and d are each 0 to 2 and the sum of (c+d) is 2;

$$R^1_e R_f SiO_{3/2} \tag{T}$$

where e and f are each 0 or 1 and the sum of (e+f) is 1; and $$SiO_{4/2} \tag{Q}$$

wherein $R^1$ is an aliphatically unsaturated group and R is an optionally substituted hydrocarbon group.

18. The process of claim 1, wherein the mean yellowness index Y* of a plurality of batches prepared by the process is higher than the mean yellowness index Y* of a plurality of batches of otherwise similar liquid silicone rubber base composition which are prepared with an organopolysiloxane bearing at least one aliphatically unsaturated group being present during reacting of silazane with fumed silica in step a).

19. The process of claim 13, wherein steps a), b), and c) all take place within one reactor.

* * * * *